US007570653B2

United States Patent
Sinha et al.

(10) Patent No.: US 7,570,653 B2
(45) Date of Patent: Aug. 4, 2009

(54) BUFFER ALLOCATION USING PROBABILITY OF DROPPING UNORDERED SEGMENTS

(75) Inventors: Amit Sinha, Santa Clara, CA (US); Mohit Jaggi, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 655 days.

(21) Appl. No.: 10/932,937

(22) Filed: Sep. 2, 2004

(65) Prior Publication Data

US 2006/0045111 A1 Mar. 2, 2006

(51) Int. Cl.
*H04L 12/56* (2006.01)
(52) U.S. Cl. .................. 370/415; 370/428; 370/476
(58) Field of Classification Search .......... 370/412, 370/413, 414, 415, 416, 417, 418; 710/52, 710/53, 54, 55, 56, 57
See application file for complete search history.

(56) References Cited

U.S. PATENT DOCUMENTS

| | | | | |
|---|---|---|---|---|
| 5,926,458 | A * | 7/1999 | Yin .............................. | 370/230 |
| 6,292,492 | B1 * | 9/2001 | Bonomi et al. ............... | 370/415 |
| 6,674,718 | B1 * | 1/2004 | Heddes et al. ............... | 370/230 |
| 6,690,645 | B1 * | 2/2004 | Aweya et al. ................ | 370/230 |
| 6,724,776 | B1 * | 4/2004 | Jeffries ........................ | 370/468 |
| 7,184,436 | B2 * | 2/2007 | Henrion ....................... | 370/390 |
| 2003/0058793 | A1 * | 3/2003 | Rochon et al. ............... | 370/229 |
| 2004/0120252 | A1 * | 6/2004 | Bowen et al. ................ | 370/229 |
| 2004/0258072 | A1 * | 12/2004 | Deforche ................. | 370/395.4 |
| 2006/0039286 | A1 * | 2/2006 | Basu et al. ................... | 370/238 |

OTHER PUBLICATIONS

Semke et al., Automatic TCP Buffer Tuning, Pittsburgh Supercomputing Center, 1998, p. 315-323.*
Feng et al., Stochastic Fair Blue: A Queue Management Algorithm for Enforcing Fairness, IEEE INFOCOM 2001, p. 1520-1529.*
Pittsburgh Supercomputing Center, "Automatic TCP Buffer Tuning" by Jeffrey Semke and Jamshid Mahdavi and Matthew Mathis, Copyright © 1998, 9 pages.
IEEE Infocom 2001, "Stochastic Fair Blue: A Queue Management Algorithm For Enforcing Fairness", by Wu-chang Feng, Dilip D. Kandlur, Debanjan Saha, and Kang G. Shin, Copyright © 2001, 10 pages.

* cited by examiner

*Primary Examiner*—Hassan Kizou
*Assistant Examiner*—Bo Hui A Zhu
(74) *Attorney, Agent, or Firm*—Michael C. Stephens, Jr.; Trellis IP Law Group, PC

(57) ABSTRACT

Allocation of buffer space for segment re-ordering is restricted based on a probability that the flow would consume too much space. A flow's current or recently past space consumption is used to predict the flow's activity with respect to future consumption. If the prediction of future consumption is high relative to other flows and to the total allocable buffer space in the device, then a decreasing amount of space than would otherwise be provided is allocated to the flow. In a preferred embodiment, if a flow's buffers are below a predetermined threshold for the flow (i.e., the "flow threshold"), and the amount of overall system memory space is above a predetermined system threshold then buffer allocation can proceed normally for that flow. For example, all of an additional amount of space that the flow may currently be requesting can be allocated to the flow. However, if one or both of the system threshold or the flow threshold requirements are not met then allocation can be according to a prediction of the behavior (i.e., consumption) of the flow.

15 Claims, 2 Drawing Sheets

BUFFER ALLOCATION USING PROBABILITY OF DROPPING UNORDERED SEGMENTS

BACKGROUND OF THE INVENTION

This invention relates in general to digital processing and more specifically to prevention of an attack on a network device by monitoring and restricting a buffer allocation within the device.

Although large digital networks such as the Internet achieve much of their popularity and power by allowing relatively unrestricted access, such open access can cause problems when unknown user's, processes or devices (i.e., an attacker) try to perform unwanted acts such as reading protected information, modifying data or executable information, or causing a malfunction or other unwanted behavior of the network or a network process, processor or device on the network (i.e., a "node"). An intentional cause of unwanted behavior of the network or a node is referred to as an "attack" by a malicious attacker. Other unwanted acts may be accidental or unintended and can arise without human intervention or direction but can do the same type of damage and behave in a similar manner to an intentional attack. In general, an "attack" for purposes of this specification includes any type of malfunction or unwanted behavior of a network or node.

There are many different types of network attacks and threats. For example, unauthorized access, exploitation of known weaknesses, spoofing, eavesdropping and denial of service are some types of attacks or threats that can be used alone or in combination with other so-called hacking techniques. Certain types of attacks such as denial of service work by sending information to a network device that causes the network device to malfunction or fail. For example, a large attachment to an email message was an early way to bring down the first primitive email servers. Although safeguards have improved, there are still weaknesses in network devices that allow certain types of attacks.

A more modern attack is to send out-of-order packets to a routing device such as a router, switch, server or other routing processor. If the device is programmed to retain out of order packets in an attempt to reorder or reassemble the packets before forwarding the message, the occurrence of a large number of out-of-order packets can mean the device must keep storing thousands or more packets and may finally run out of memory space. Such a condition could cause an error, such as a lost message, or failure of the device as where the device's processor does not have sufficient memory with which to operate. This type of attack is referred to as a "state holding" attack since it arises due to the device attempting to maintain the proper state of out of order packets or segments.

Some devices need to deal with many different message streams or flows at the same time. For example, security devices such as firewalls and Intrusion Detection Systems (IDS) require reassembly of Transfer Control Protocol (TCP) segments before application layer (L7) inspection can be done. These devices usually need to buffer out-of-order segments until a contiguous set of ordered segments is available for processing.

In these devices, buffer space may be dynamically allocated to a flow based on the detection or prediction of that flow's needs. If one flow is experiencing a large amount of lost or unordered packets then increasing amounts of buffer space might be diverted to the problematic flow. However, this means that the performance of packet reordering in the other flows may be hindered due to lack of buffer space. In a case where a flow has become problematic due to a prolonged attack, the device may be severely impaired in its ability to handle other flows' traffic in an efficient, or even marginally functional, way.

Some approaches to solving the buffer allocation problem include simply placing a hard limit to the amount of buffer space that a flow can use. However, this often results in sub-optimal buffer utilization. Another approach can be found in Stream4 for Snort where older or "stale" flows are deleted if memory usage is high among active flows. Flows can also be picked at random for deletion. This approach is susceptible to a state holding type of attack.

Linux (2.4) uses an approach to maintain system-wide thresholds to limit buffer usage of a flow. For applications that have not explicitly set the Transmission Control Protocol (TCP) send and receive buffer sizes, the kernel attempts to grow the window sizes to match the available buffers size (up to the receiver's default window). If there is high demand for kernel/network memory, buffer size may be limited.

A flow can get any amount of memory provided the system buffer usage is below a low water mark. If the system memory usage grows beyond this threshold, the remaining buffers for TCP get equally divided among active flows. By reserving memory for flows that may never need it, this mechanism provides an absolute fairness at the expense of sub-optimal buffer utilization.

A paper entitled "Automatic TCP Buffer Tuning" by Jerey Semke et. al., Pittsburgh Supercomputing Center, describes a max-min fair share type of algorithm. In this approach, every connection gets up to 1/Nth of the unallocated pool, taking no more than what it needs. If a connection needs less that its 1/Nth portion, the remainder of the portion is left in the pool. After giving each connection a slice, the remaining unallocated pool is divided up among the unsatisfied connections, continuing in this manner until either the pool is empty or all connections are satisfied.

However, these approaches are suited for environments where all sessions are known to be trusted and do not provide protection in the case of a deliberate attack. Also, to ensure fair sharing the computation to calculate a flow's fair share must be performed relatively often. This can be a significant system overhead. The auto tuning approach of Linux reserves memory for flows that may never need it and thus is not useful for systems with large number of concurrent flows.

Although some approaches might be improved with memory recovery techniques, such as garbage collection, these recovery techniques can also be compute-intensive. Also, the garbage collection based approach dumps segments based on the instantaneous buffer usage of a flow and hence causes a bursty behavior. Since the Round Trip Time (RTT) of flows differs widely, the expected time of a segment in the queue also varies. A flow having large number of unordered segments should not be penalized provided the average arrival and departure rate of segments over a window of time is almost the same.

SUMMARY OF EMBODIMENTS OF THE INVENTION

One embodiment of the invention provides a network device that allocates buffer space for segment re-ordering by restricting the space provided to flows based on a probability that the flow would consume too much space. A flow's current or recently past space consumption is used to predict the flow's activity with respect to future consumption. If the prediction of future consumption is high relative to other flows and to the total allocable buffer space in the device, then a decreasing amount of space than would otherwise be provided is allocated to the flow.

In a preferred embodiment, if a flow's buffers are below a predetermined threshold for the flow (i.e., the "flow threshold"), and the amount of overall system memory space is above a predetermined system threshold then buffer allocation can proceed normally for that flow. For example, all of an additional amount of space that the flow may currently be requesting can be allocated to the flow. However, if one or both of the system threshold or the flow threshold requirements are not met then allocation can be according to a prediction of the behavior (i.e., consumption) of the flow.

One way to determine predicted behavior of a flow is to measure the consumption of the flow over an interval. A default allocation (e.g., the total amount of memory space for buffers divided by the number of flows) for the flow is directly proportional to the allocation, while the measurement is inversely proportional to the allocation. Thus, for example, the computed allocation can be the default allocation divided by the measurement.

In a preferred embodiment, space is allocated to a flow in a deterministic manner by using the computed allocation as a probability of allocation. For example, if the computed allocation is 0.5 then there is a 50% chance that the space requested by the flow will be allocated to the flow. Each time that a flow requests a buffer, the drop probability goes up and each time the flow releases a buffer, the drop probability goes down, assuming the buffer usage is above a threshold amount.

In one embodiment the invention provides a method for allocating buffer space in a network device, wherein a plurality of buffers are used to re-order out-of-order segments in data flows through the device, the method comprising: determining a prediction of a consumption of space of a particular flow; obtaining a value for an amount of allocable system memory space; and deriving an allocation of space for the particular flow by using the prediction and value, wherein the allocation is in inverse proportion to the prediction and in direct proportion to the value.

Another embodiment provides a method for allocating storage space in a network device, wherein the network device receives segments from a plurality of flows, the method comprising receiving segments for Transmission Control Protocol (TCP) reassembly; storing the segments in a buffer; requesting additional storage space for the buffer; and determining an allocation of storage space for the buffer by using a rate of the buffer's utilization of storage space, number of flows and available storage space.

DETAILED DESCRIPTION OF EMBODIMENTS OF THE INVENTION

Figure 1:
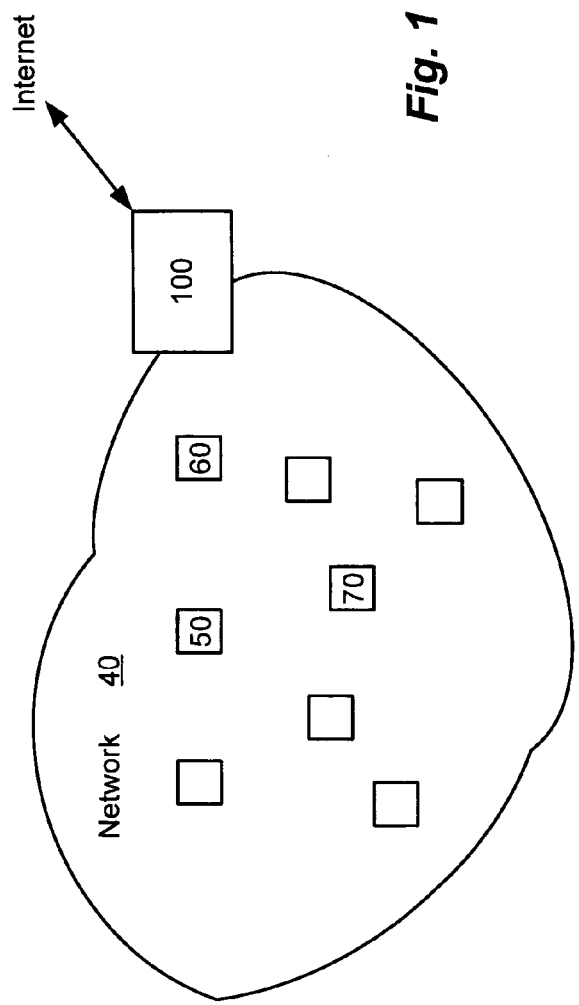
FIG. 1 shows an edge device in an enterprise network.

FIG. 1 shows device 100 at an edge of network 80 so that traffic from various devices such as 50, 60 and 70 can be routed through device 100 to and from the Internet. Network 80 can be, for example, an enterprise network, corporate or campus local area network (LAN), etc. Device 100 can be a switch, router, server, backbone, or other network device or node. It is contemplated that applications of various features of the invention may be desirable in a device that monitors traffic from an enterprise network to the Internet. In general, however, features, functions or other aspects of the invention may be used in any suitable device and with any desirable network configuration or arrangement.

In a device as shown in FIG. 1, there may be many sources of information transfer intended for a node within the enterprise network or for a destination on the Internet. In such an application there can be many source/destination pairs, or flows. Each flow will typically have memory space in the form of a buffer allocated to the flow. As packets, segments, or other portions of information arrive at the device out-of-order, the buffer space associated with the flow on which the out-of-order information is received must be increased until the information is put in order and transferred out from the device. Due in part to the high volume of buffering that can occur, such a device may be susceptible to an attack that intentionally sends many out-of-order segments on one or more flows, since flows receiving many out-of-order segments will need additional buffer space to store the segments until they can be reordered and transferred.

Figure 2:
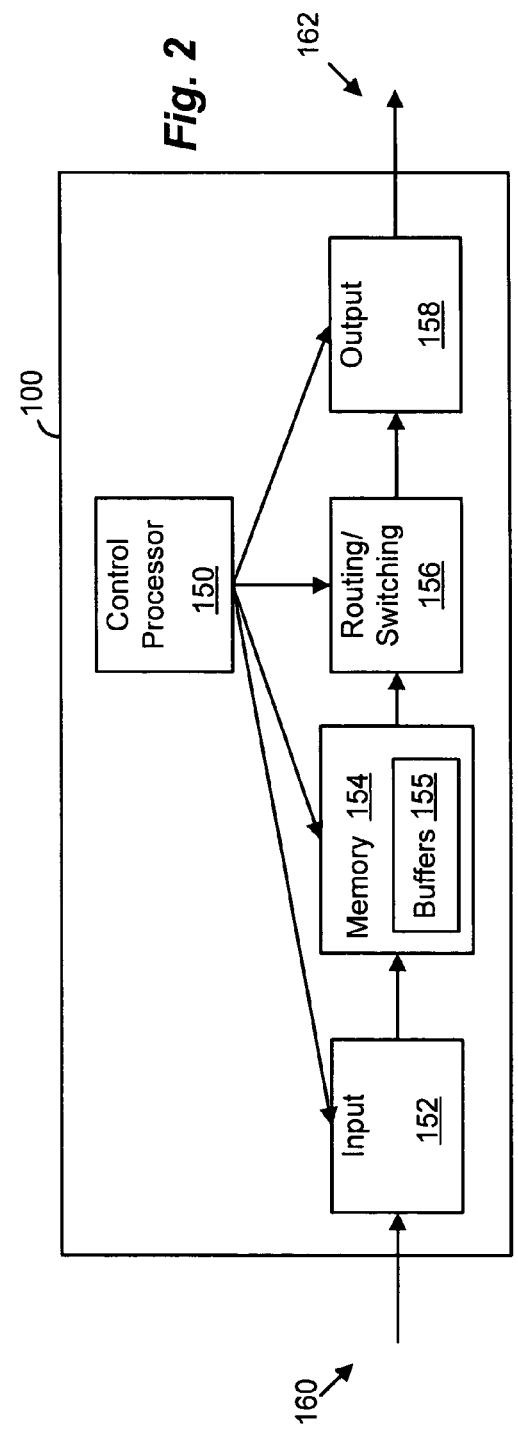
FIG. 2 shows an example of components and resources of a device.

FIG. 2 illustrates basic components inside device 100. FIG. 2 is a simplified example of a device and other devices can have different numbers and types of components. Control processor 150 directs and coordinates functions using components and resources within the device such as memory 154, buffers 155, routing/switching 156 and output 158. Device 100 receives data at 160 as, for example, from a source process or processor. Input 152 receives and processes incoming data and provides data (e.g., segments of a flow) to buffers 155 that are a subset of a memory space defined by memory 154. Segments in the buffers can be checked, reordered, deleted, replicated, etc., as desired.

Segments from the buffers are provided to routing/switching 156 for forwarding and preparing, as needed. Finally output 158 transfers the segments to output 162 to send the data to a destination. Typically the path shown in FIG. 2 is duplicated in the opposite direction by the same or analogous components and resources.

Figure 3:
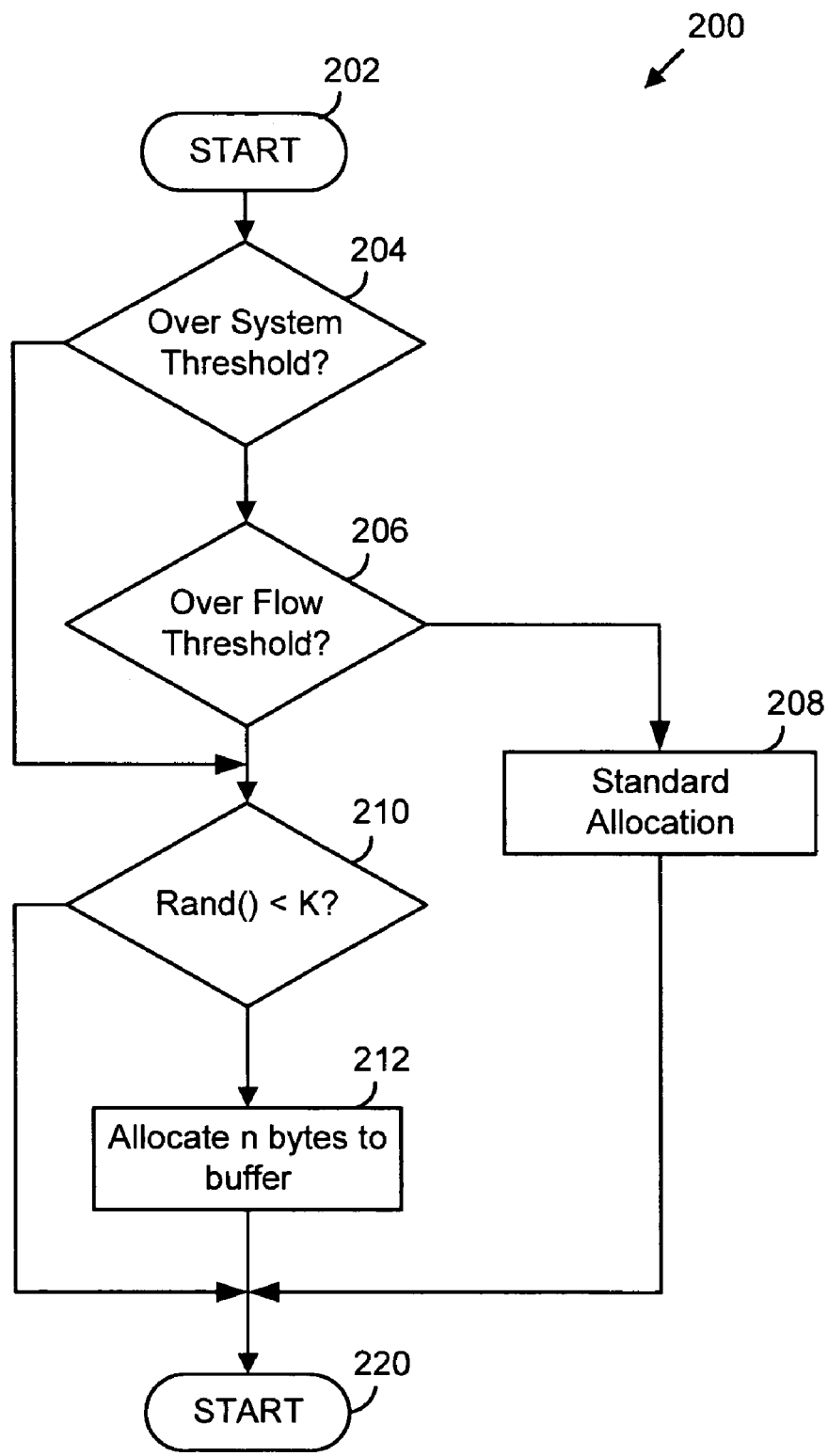
FIG. 3 illustrates basic steps in a process for doing probabilistic allocation of buffer space.

FIG. 3 shows a flowchart illustrating basic steps according to an embodiment of the invention. In FIG. 3, flowchart 200 is entered at step 202 when a buffer makes a request for n additional bytes of memory, where n is an integer number. Naturally, any type and amount of storage or other resource can be the subject of allocation to a buffer or other a flow-related structure or processing. For example, if out-of-order segments are stored in hardware registers or queues, the request can be for additional queues.

Parameter values can be determined prior to, or at the time of execution, of the steps in FIG. 3. A preferred embodiment divides the total memory space available for allocation by the number of currently active flows to find a nominal allocation for each flow. The nominal allocation can change during device processing as some flows will require more than the nominal allocation and other flows require less. Another important parameter is the measured activity for each flow. The flow activity is a measure of the amount of requested buffer space made by the flow within an interval. A preferred embodiment, discussed in more detail, below, uses a "drop probability" value for each flow. The drop probability value is made larger when a flow requests additional buffer space and is made smaller when a flow releases buffer space so that the released space is available for allocation to other flows.

At step 204 of FIG. 3 a check is made as to whether the allocation for n additional bytes of memory would cause the total allocation (for all flows) to be over a predetermined system threshold. If not, step 206 is performed to check whether the allocation of n bytes would cause the allocation for the requesting flow to be over a predetermined flow threshold. If neither threshold is exceeded then step 208 is executed to perform a standard allocation of the requested n bytes. Note that traditional methods of allocating buffer space may be used at step 208.

If either the system threshold or the flow threshold is exceeded then step 210 is performed to test whether the drop probability, K, allows allocation of the requested n bytes. In the flowchart this is depicted as the result of a random number generator function, Rand( ), being compared to K. If the random number is less than K then step 212 is performed to allocate the requested n bytes to the buffer. Otherwise, allocation is skipped and the routine terminates at step 220. Thus, the routine of FIG. 3 acts to allocate space to a flow statistically depending on the flow's prior activity. Note that other approaches can be used that can vary from the steps shown in the flowchart. For example, one or both of the threshold checks can be omitted. Other criteria can be used to dictate whether-statistical allocation is performed as opposed to standard allocation (or no allocation). Other approaches are possible.

Table I shows pseudo code for routines to increase and decrease the drop probability in a preferred embodiment. In Table I, the function drop_modify( ) returns a value for modifying a drop probability for a given flow. The routine drop_modify( ) computes the number of active flows divided by the number of remaining allocable storage (e.g, memory space). A predefined "delta" is used as a scale factor that can be hardcoded, set by a user, obtained or modified by measurement or experimentation, etc. The delta value can be changed dynamically during operation of the device or can be a static or intermittently changing value. The divide result is multiplied by the delta value and is returned as the drop_modify( ) function value.

Table I also shows routine enqueue( ) that is invoked whenever flow processing requests additional space for a particular flow. The enqueue routine accepts a flow identifier, flow_ID, that includes any combination of source IP, destination IP, source port or destination port. Other embodiments can use any other identification criteria First a hash function is applied to flow_ID to obtain indexes used to update the drop probability of the particular flow.

TABLE 1

```
drop_modify( )
{
    return delta * (number of active flows / size of allocable storage)
}
*increase drop probability*
enqueue (flow_ID)
{
    hash the flow_ID to get h0, h1, h2 . . . hL-1
    for (i=0; i<L-1; i++) {
        if (B[hi].qlen > enqueue_threshold) {
            B[hi].pm += drop_modify( );
        }
    }
    pmin = min(B[h0].pm, B[h1].pm, . . . B[hL-1].pm);
}
*decrease drop probability*
dequeue(flow_ID)
{
    hash the flow_ID to get h0, h1, h2 . . . hL-1
    for (i=0; i<L-1; i++) {
        if (B[hi].qlen > dequeue_threshold) {
            B[hi].pm -= drop_modify( );
        }
    }
}
```

Parameter values for buffers corresponding to flows are kept in an array, B[ ] of size L. The loop checks whether each flow's queue length, B[hi].qlen, is over a flow threshold and, if so, increases the drop probability, B[hi].pm, by the value returned by drop_modify( ). After all flows have been processed, pmin is calculated as the minimum of all of the drop probabilities. If current buffer usage is greater than the system threshold then segments for the flow_ID are subjected to the drop probability as described above with respect to the flowchart of FIG. 3, where K is the pmin value.

The dequeue( ) routine is similar to the enqueue( ) routine except that drop probabilities are decreased according to the drop_modify( ) function depending on whether the queue length value for a flow has fallen below a threshold for the flow. Note that enqueu_threshold and dequeue_threshold can be the same or different values depending on a particular application.

Even after applying probabilistic allocation to a flow (i.e., dropping segments from a flow if requested space is not allocated) if a flow's queue depth continues to grow and exceeds a threshold, a tail drop mechanism is used until the queue depth falls below another threshold. In a preferred embodiment the tail drop approach is merely to continue denying allocation. In other embodiments different procedures can be used when a threshold is exceeded.

Although reference has been made to specific embodiments these embodiments are merely illustrative, and not restrictive of the invention. For example, although specific units of information such as a packet, segment, message, etc., may be discussed, in general any type of amount of data represented in any suitable format can be acceptable. Although the invention has been discussed with respect to Internet Protocol and it's characteristics (e.g., IP addresses, port values, etc.), it is possible that aspects of the invention can be used with other protocols having different characteristics. For example, in some forms of communication a Machine Access Code (MAC) address may be used instead of, or in addition to, an IP address. A semiconductor or "chip" identifier or other hardware identification can be used. In a process-to-process application each process may have a process ID that can be a single value, string or other arbitrary identification (e.g., a time stamp, location identifier, etc.) that can be used to indicate source and destination entities. In general, aspects of the present invention can be used in cases where multiple resources such as IP addresses, ports, memory locations, access codes, accounts, etc., can be the subject of undesired access by an outside device.

Although buffers, memory and other characteristics of storing data are described, other characteristics can be used with various features of the invention. For example, a buffer can be of any type of storage design as is known in the art. Queues, arrays, linked lists, structures, objects, etc., can be employed. Although a preferred embodiment allocates memory storage to the buffers, any other type of storage such as magnetic, optical, chemical, biological, microelectromechanical, quantuum, etc., can be used.

Note that the flowcharts presented in this specification are merely examples of the broad, basic steps of one or more specific ways to achieve functionality according to the present invention. In general, steps can be added to, removed from, or changed from those described.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable" or "machine readable" medium for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for allocating buffer space in a network device, the method comprising:

using a plurality of buffers in the network device to re-order out-of-order segments in data flows through the network device;

determining a prediction of a consumption of space in the plurality of buffers for a particular flow, wherein the particular flow comprises out-of-order segments;

obtaining a value for an amount of allocable system memory space in the plurality of buffers;

deriving an allocation of space in the plurality of buffers for the particular flow to allow for re-ordering of out-oforder segments in the particular flow by using the prediction and the value, wherein the allocation is in inverse proportion to the prediction and in direct proportion to the value;

changing a drop probability for the particular flow when a predetermined flow operation is encountered, wherein the allocation of space in the plurality of buffers to allow for re-ordering of out-of-order segments in the particular flow is configured to be adjusted using the changed drop probability;

hashing a flow identifier for the particular flow to obtain a parameter;

using the obtained parameter to determine a threshold;

when the predetermined flow operation is an enqueue operation, increasing the drop probability for the particular flow when the determined threshold is greater than a comparison threshold, the drop probability being incremented by a scale factor multiplied by a number of active data flows divided by a number of available buffers from the plurality of buffers; and when the predetermined flow operation is a dequeue operation, decreasing the drop probability for the particular flow when the determined threshold is less than the comparison threshold.

2. The method of claim 1, wherein the determining the prediction includes measuring an allocation of space for the particular flow during a time interval.

3. The method of claim 2, wherein the obtaining the value includes setting the value equal to a total amount of system memory divided by a number of flows.

4. The method of claim 3, wherein the number of flows is equal to the number of active data flows at the network device.

5. The method of claim 3, wherein the number of flows is equal to a predetermined quantity.

6. The method of claim 1, further comprising modifying the scale factor by experimentation.

7. The method of claim 1, wherein the flow identifier includes a source IP address.

8. The method of claim 1, wherein the flow identifier includes a destination IP address.

9. The method of claim 1, wherein the flow identifier includes a source port.

10. The method of claim 1, wherein the flow identifier includes a destination port.

11. The method of claim 1, further comprising determining whether a current buffer usage is above a predetermined threshold and, if so, using the drop probability to drop a segment in the particular flow.

12. The method of claim 1, wherein the scale factor is set by a user of the network device.

13. A method for allocating storage space in a network device, wherein the network device receives segments from a plurality of flows, the method comprising:

receiving out-of-order segments for Transmission Control Protocol (TCP) reassembly for a particular flow;

storing the received segments in a buffer for re-ordering the received out-of-order segments;

requesting additional storage space for the buffer for re-ordering the received out-of-order segments;

determining an allocation of storage space for the buffer by using a rate of utilization of storage space by the buffer over a time period as a prediction of a consumption of the storage space, a number of flows, and available storage space;

hashing a flow identifier for a particular flow to obtain a parameter;

using the obtained parameter to determine a threshold; and increasing a drop probability for the particular flow when the determined threshold is greater than a comparison threshold value, the drop probability being incremented by a scale factor multiplied by a number of active flows divided by a number of available portions in the buffer.

14. An apparatus, comprising:

means for using a plurality of buffers in the apparatus to re-order out-of-order segments in data flows through the apparatus;

means for determining a prediction of a consumption of space in the plurality of buffers for a particular flow, wherein the particular flow comprises out-of order segments;

means for obtaining a value for an amount of allocable system memory space in the plurality of buffers;

means for deriving an allocation of space in the plurality of buffers for the particular flow to allow for re-ordering of out-of-order segments in the particular flow by using the prediction and the value, wherein the allocation is in inverse proportion to the prediction and in direct proportion to the value;

means for changing a drop probability for the particular flow when a predetermined flow operation is encountered, wherein the allocation of space in the plurality of buffers to allow for re-ordering of out-of-order segments in the particular flow is configured to be adjusted using the changed drop probability;

means for hashing a flow identifier for the particular flow to obtain a parameter;

means for using the obtained parameter to determine a threshold;

when the predetermined flow operation is an enqueue operation, means for increasing the drop probability for the particular flow when the determined threshold is greater than a comparison threshold, the drop probability being incremented by a scale factor multiplied by a number of active data flows divided by a number of available buffers from the plurality of buffers; and when the predetermined flow operation is a dequeue operation, means for decreasing the drop probability for the particular flow when the determined threshold is less than the comparison threshold.

15. The apparatus of claim 14, wherein the means for determining the prediction comprises means for measuring an allocation of memory space for the particular flow during a time interval.

* * * * *